United States Patent [19]

Itagaki

[11] 3,889,074

[45] June 10, 1975

[54] HEAD PHONE UNIT

[75] Inventor: Tadasi Itagaki, Tokorozawa, Japan

[73] Assignee: Pioneer Electronic Corporation, Tokyo, Japan

[22] Filed: Nov. 6, 1973

[21] Appl. No.: 413,285

[30] Foreign Application Priority Data

Nov. 14, 1972 Japan .............................. 47-130300
Nov. 14, 1972 Japan .............................. 47-130301

[52] U.S. Cl. .......................... 179/182 R; 179/182 R
[51] Int. Cl. .............................................. H04r 1/10
[58] Field of Search ................................. 179/182 R

[56] References Cited

UNITED STATES PATENTS 2,946,862 7/1960 Wadsworth et al. ............ 179/182 R
3,122,613 2/1964 Gongoll et al. ................. 179/182 R

*Primary Examiner*—William C. Cooper
*Attorney, Agent, or Firm*—Sughrue, Rothwell, Mion, Zinn and Macpeak

[57] ABSTRACT

The present invention describes a head phone unit having a speaker frame, speaker case, and a case retention band wherein the parts of the unit are retained in assembled relationship by a fastening pin which also affixes the unit to a head band assembly. This construction enables more efficient assembly methods due to the reduced number of parts and, consequently, reduces the unit cost and the percentage of defective units produced.

5 Claims, 8 Drawing Figures

HEAD PHONE UNIT

This invention relates to a head phone unit and, in particular, to an improvement for the mounting between a case and a frame thereof.

BACKGROUND OF THE INVENTION

Conventional head phone units usually consist of inner cases made of synthetic resin or the like covered with soft leather or vinyl mounted directly to speaker frames by screws. Head bands interconnecting two head phone units are separately mounted to the frames. Name plates, impressed with manufacturers names and the like are secured to the inner cases by way of the leather or vinyl covering material.

The head phone units described above are assembled in the following manner. The soft covering is stitched on the outer surface of the inner cases and, at the same time, name plates are fixed to the inner cases. Then, the inner cases are mounted to the frames by screws and, finally, head bands are rotatably mounted to said frames.

The mounting of the inner cases to the frames, name plates to the inner cases, and head bands to the frames are usually performed independently of each other. This process requires a considerable number of assembly steps and requires a great number of separate parts. This inherently results in high manufacturing costs and a large percentage of defective articles.

SUMMARY OF THE INVENTION

The present invention relates to a head phone unit having a unique construction and method for assembly which obviates the foregoing inconveniences and results in the saving of assembly steps and reduces the cost by decreasing the number of parts.

Another object of this invention is to provide a head phone unit having unique design with fine appearance.

Still another object of this invention is to provide a head phone unit and method of assembly which reduces the yield of defective articles.

These objectives are accomplished by a unique head phone unit construction which requires the assembly of only three major components, the components being retained together by the same fastener which affixes the phone unit to the head band. Thus, the unit may be assembled and affixed to the head band at a single stage of the assembly process.

DETAILED DESCRIPTION OF PREFERRED EMBODIMENT

Figure 2:
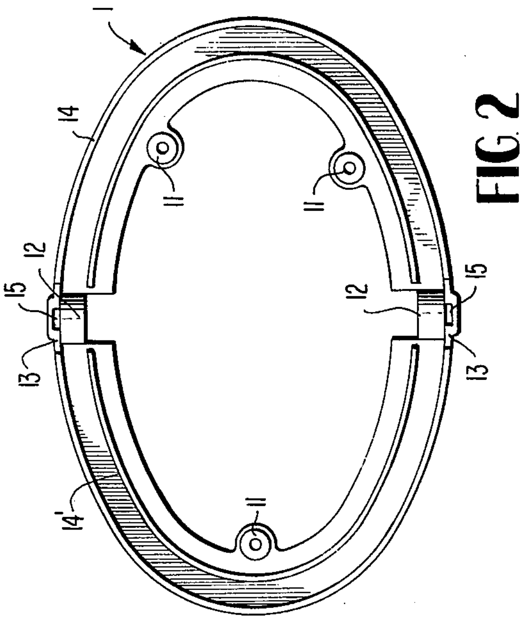
FIG. 2 is a plan view of the speaker frame.
Figure 1:
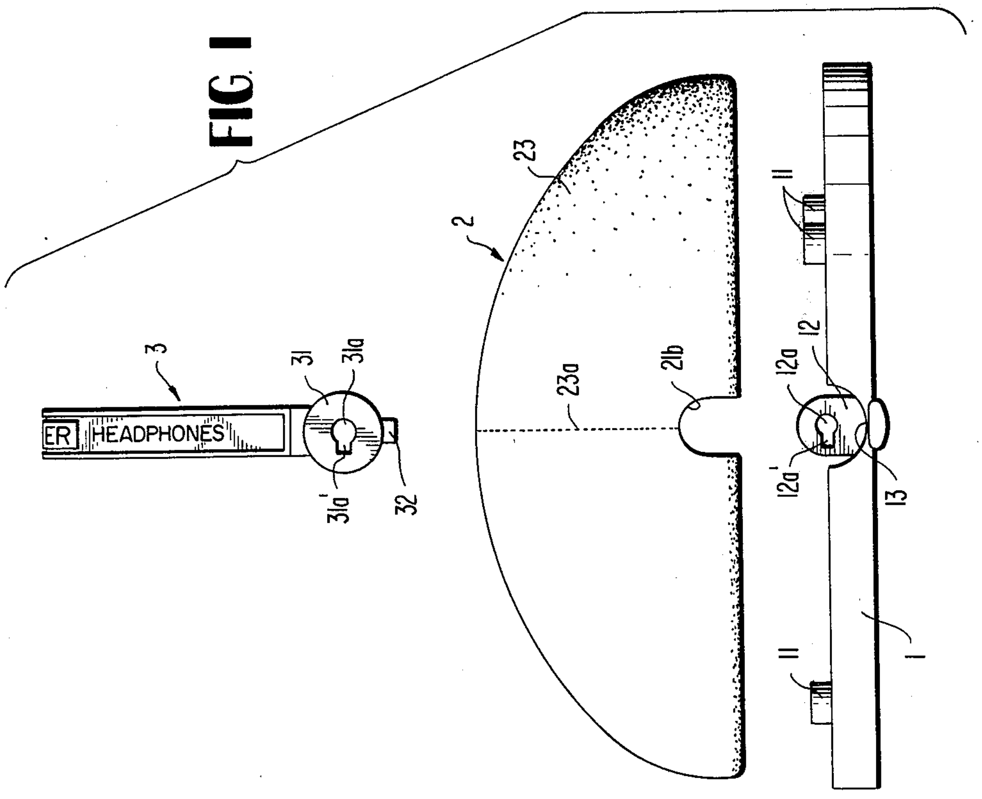
FIG. 1 is an exploded view of a head phone unit of the present invention.

The present invention will now be described by referring to the accompanying drawings. FIGS. 1 and 2 show a frame 1 to which a speaker (not shown) is mounted by way of three bosses 11. Two projections 12 formed with apertures 12*a* having key slots 12*a*′ are integrally formed on diametrically opposite sides of frame 1 for engaging axes therethrough, and portions of the outer periphery of frame 1 adjacent to said projections 12 are notched in the form of arc shown by notch 13. The frame 1 is provided with two ridges 14 and 14′ in parallel with the outer periphery thereof to form a groove in which case 2 is engaged. Depressions 15 are provided in frame 1 at the lowermost portion of the arc shaped notch 13.

Figure 3:
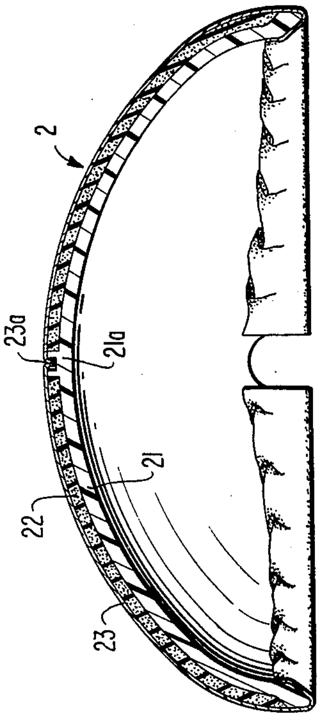
FIG. 3 is a cross sectional view of the case.

FIG. 3 shows a case 2 consisting of an inner case 21 made of synthetic resin, etc., cushion material 22 such as sponge or the like affixed to the outer surface of said inner case 21, and a soft outer covering 23 preferably formed by stitching two leather or synthetic leather pieces together and affixed to the outer surface of the cushion material 22. The covering and cushion material may be affixed by glueing or other means known in the art. Slot 21*a* is formed at the center of said inner case 21, to receive the stitched portion 23*a* of the soft outer covering 23 to provide a smooth outer surface. Inner case 21 has notches 21*b* formed in diametrically opposite sides thereof to engage the projections 12 of the frame 1. Those portions in the soft outer covering 23 which correspond to the notches 21*b* of the inner case 21 are also cut out. The periphery of the soft case 23 is arranged in such a way as to be wrapped around the periphery of the inner case 21 and attached to the inner surface thereof to prevent easy removal of said covering.

Figure 4:
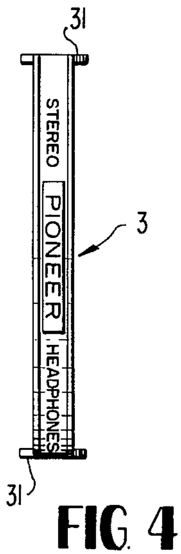
FIG. 4 is a plan view of the case retention band.

A band 3 is shown in FIGS. 1 and 4 having a shape corresponding to that of the outer periphery of case 2 and impressed with the manufacturers name or the like on the outer surface thereof. At the both ends of the band 3, support portions 31 are formed along with projections 32. The support portions 31 have apertures 31*a* with key slots 31*a*′ formed therein which align with the apertures 12*a* and key slots 12*a*′ provided in the projections 12 of the frame 1.

Figure 5:
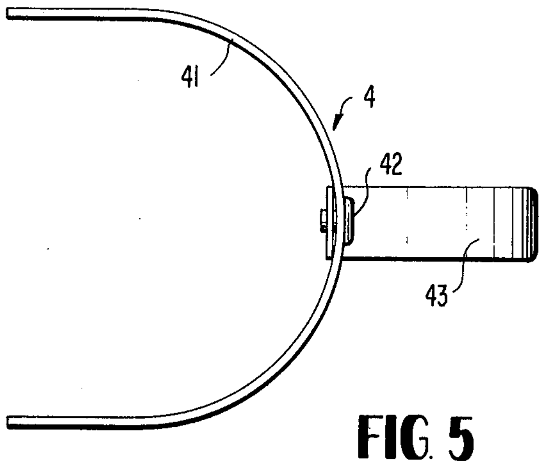
FIG. 5 is a side view of the head band.
Figure 6:
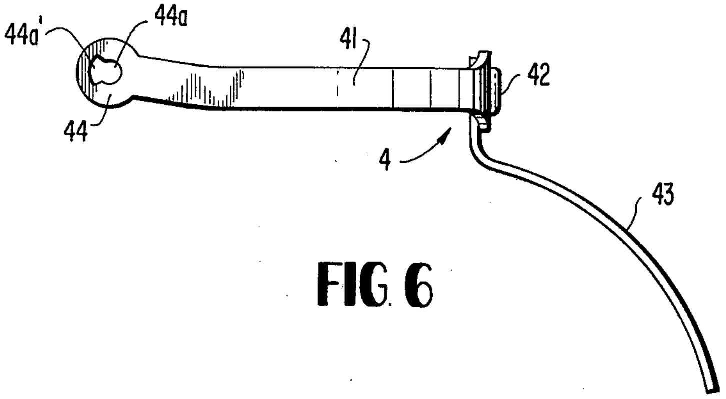
FIG. 6 is a partial front view of the head band shown in FIG. 5.

FIGS. 5 and 6 show a head band 4 consisting of a semi-circular retention portion 41 and a connection plate 43 secured at the center of said retention portion 41 by way of a pin 42. Enlarged portions 44 are formed at both ends of retention portion 41, which are, in turn, provided with apertures 44*a* having arcuate key slot 44*a*′. The connection plate 43 is slidably attached to a connection band (not shown) which connects it with another head phone unit.

Figure 8:
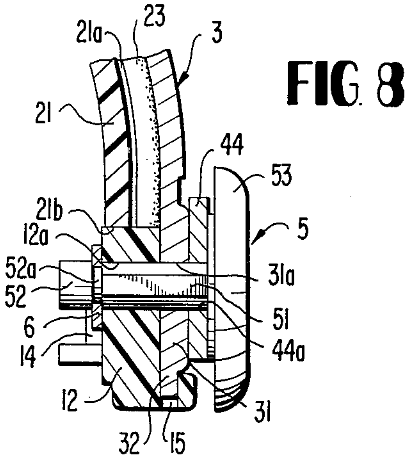
FIG. 8 is a partial cross sectional view of the assembled structure.
Figure 7:
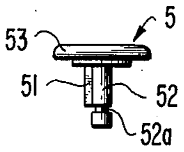
FIG. 7 is a side view of the fastening pin.

The pin for attaching the band 3 to the frame 1 and for attaching the unit to the retention portion 41 of head band 4 is shown in FIG. 7. The pin has a generally cylindrical, elongated portion 52 with key 51, extending perpendicularly from head portion 53. Elongated portion 52 has a slot 52*a* about its periphery adjacent the end furtherest from head portion 53 to engage washer 6 as shown in FIG. 8.

The method of assembling the head phone unit of this invention will now be described.

Case 2 is placed into the slot formed between ridges 14 and 14′ of frame 1 such that projections 12 engage notches 21*b* to establish a tight seal. Then band 3 is placed over case 2 such that the support portions 31 thereof engage the arc notches 13 of the frame 1 and the projections 32 engage the depressions 15, also in frame 1, whereby the stitched portion 23*a* of the case 2 is covered with the band 3. Thereafter, the enlarged portions 44 of the head band 4 are placed over the support portions 31 of band 3 such that the apertures 31*a* of the support portions 31 are aligned with the apertures 44*a* of the enlarged portion 44. Then, the pins 5 are inserted through apertures 44*a*, 31*a* and 12*a*, and the washers 6 are engaged with slot 52*a* to secure the assembly together. Since the keys 51 of pins 5 are engaged into the key slots 31*a'* in the support portions 31 of the band 3 and the key slots 12*a'* in the projections 12 of the frame 1, pins 5 and band 3 cannot rotate relative to each other.

However, since the head band 4 has the arcuate slots 44*a'* in enlarged portion 44, the units can rotate relative to head band 4 to the extent allowed by the angle of the apertures 44*a'*. This allows the wearer to adjust the units to achieve optimum comfort.

Cushion material for ear pads is, of course, provided at the lower face of the frame 1 although not shown in the drawings.

In the aforementioned embodiment, the band 3 is generally U-shaped. However, it may alternatively be formed in an arch forming cross-shape, for example, where the soft outer covering 23 of case 2 is divided into four portions, so as to cover the stitched portion thereof. In such a case, two ends which are not fixed to the frame 1 by way of the pins 5 may be fixed there by means of projections, apertures or other means generally known in the art.

What is claimed is:

1. A head phone unit having a speaker comprising:

a. a frame to which the speaker is attached, b. a cover to enclose the rear of the speaker, c. a layer of cushioning material attached to the outer surface of the cover, the cushioning material having a seam extending across said cover, d. means to attach said cover to said frame, wherein said attachment means covers said seam in said cushioning means, e. means to pivotally connect said frame to a head band.

2. The head phone unit of claim 1 wherein:

a. the frame is of an oval shape, and has upwardly facing projections at two diametrically opposite positions with apertures therethrough, b. the cover is of a generally semi-ellipsoidal shape and has two downwardly opening notches to engage the projections of the frame, c. the cover attaching means is a band with apertures through each end which engages the outer surface of the cover and has its ends attached to the frame, d. the means to connect the frame to the head band are pins inserted through aligned apertures in the head band, cover attaching band and the upward projections of the frame.

3. The head phone unit of claim 1 wherein the means attaching the cover to the frame also attaches the frame to the head band.

4. The head phone unit of claim 1 wherein the cover attaching means comprises a band, shaped to conform to the outer surface of said cover, engaging the outer surface of said cover and the ends of said band are attached to said frame.

5. The head phone unit of claim 4 wherein the ends of the band are attached to the frame by threadless fasteners.

* * * * *